No. 608,610. Patented Aug. 9, 1898.
J. KIRBY, Jr.
GLASS HOLDER.
(Application filed Dec. 6, 1897.)
(No Model.)
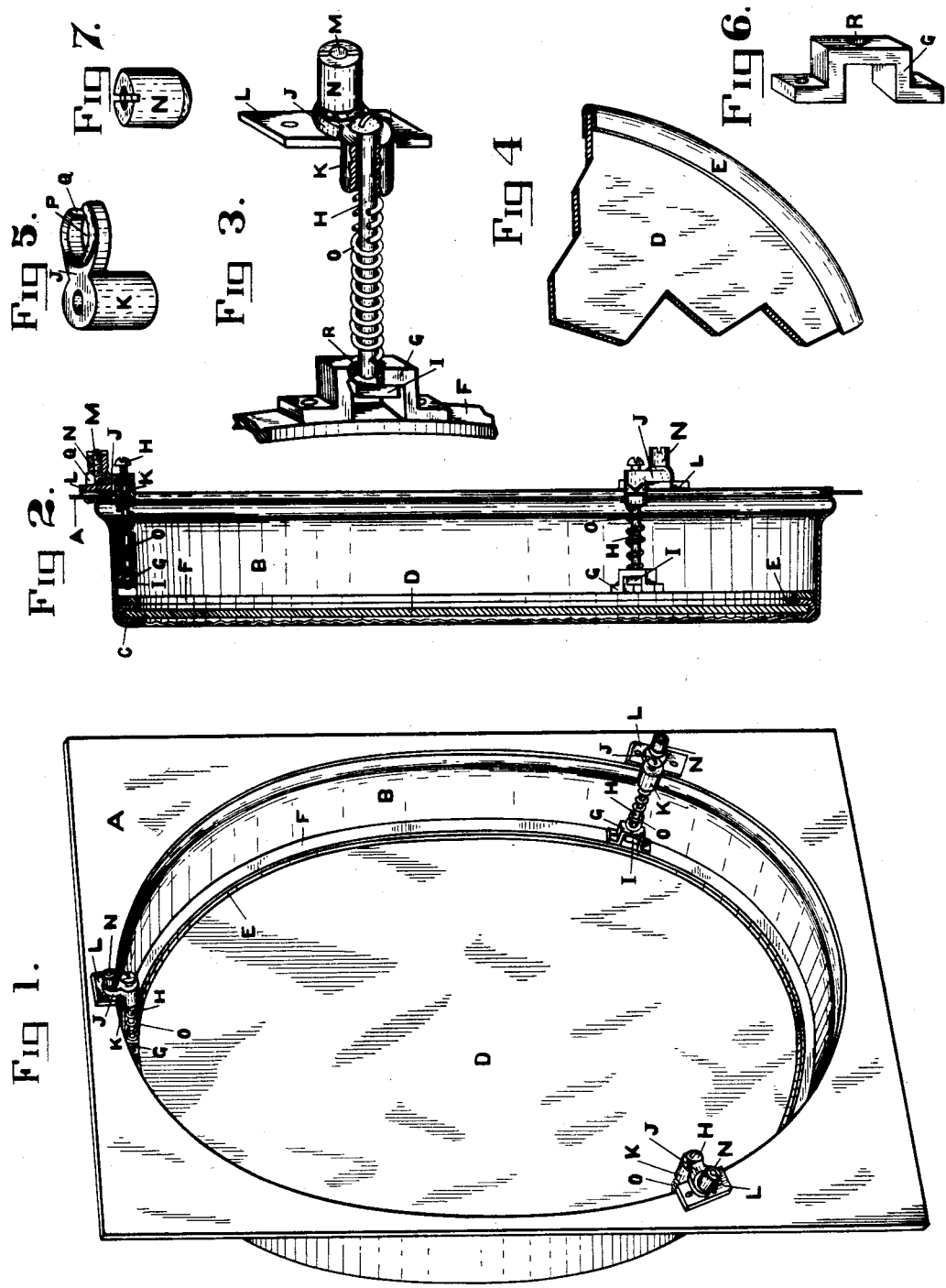
Attest
H. C. Colson.
E. B. Lehman
Inventor.
John Kirby Jr.

United States Patent Office.

JOHN KIRBY, JR., OF DAYTON, OHIO, ASSIGNOR TO THE UNITED STATES HEAD-LIGHT COMPANY, OF UTICA, NEW YORK.

GLASS-HOLDER.

SPECIFICATION forming part of Letters Patent No. 608,610, dated August 9, 1898.

Application filed December 6, 1897. Serial No. 660,993. (No model.)

*To all whom it may concern:*

Be it known that I, JOHN KIRBY, Jr., a citizen of the United States, residing at Dayton, in the county of Montgomery and State of Ohio, have invented certain new and useful Improvements in Resilient Glass-Holders, of which the following is a full, clear, and exact description.

My invention relates to a device for holding the front glass in locomotive and other headlights and in other places to which the same may be applicable.

The invention has for its object to provide a simple, efficient, and inexpensive resilient glass-holder for securing the front glass in the extension of a headlight-case and in other forms of lamps, lanterns, &c., and by which the use of plaster, cement, or putty (means heretofore commonly employed) is obviated. The invention consists of certain novel construction and arrangement of parts hereinafter fully described, and pointed out in the claims at the end of this specification. Several mechanical contrivances have been devised to overcome the disadvantages incident to the use of plastic material for the purpose, none of which, however, have proven to be entirely satisfactory and are therefore not largely employed.

My invention overcomes the objections common to other mechanical forms of glass-holders, is an improvement upon the method of plastering or cementing the glass in place, and affords means for quickly and conveniently replacing a glass without the necessity of removing the case from its support.

In the accompanying drawings, forming a part hereof, Figure 1 is a perspective view of the front side of a locomotive-headlight case with the ordinary extension attached and showing my improvement applied thereto as seen from the inside of the case; Fig. 2, a vertical section through the center line of Fig. 1; Fig. 3, an enlarged broken perspective view of one of the spring-actuated rods and its appurtenances attached to a portion of the annular glass-holding ring; Fig. 4, an enlarged broken sectional view of a portion of the glass disk, showing a rubber binding around the edge thereof; Fig. 5, an enlarged perspective view of one of the arms; Fig. 6, a similar view of one of the bridge-pieces detached from the annular glass-holding ring, and Fig. 7 a perspective view of one of the binding-nuts.

Like letters of reference indicate corresponding parts in all the figures.

A represents the front wall of a locomotive-headlight of ordinary construction, having a large central opening and the usual extension B, forming a part of the case and provided with an annular flange C at its outer end and against which a plate of glass D, the size of which is approximately the same as that of the inside of the extension, rests. The flange C is usually formed by turning the edge of the extension B in a crimping-machine in order to avoid the necessity of cutting it out of a sheet of material and seaming or otherwise uniting it to the extension, which is more expensive than to turn the edge, and thus form the flange in one piece with the extension; but as the latter operation leaves the flange crimped or fluted it is advisable to place a rubber washer between the disk of glass and the flange to fill the interstices formed by the flutes, and thus prevent rain and snow from beating into the case. Therefore I take a piece of rubber tube E of proper length and slit it from end to end, then connect the ends together and stretch the tube over the edge of the glass, as more clearly shown in Fig. 4, thus forming an elastic binding around the edge of the glass.

The glass-holder consists of a ring F, provided with a plurality of bridge-pieces G, bolts H, nuts I, arms J, having hollow bosses K, plates L, provided with screw-threaded posts M, binding-nuts N, and spiral springs O. The plates L are riveted or otherwise secured to the inside face of the case-wall A. The arms J being provided with perforations P and slots Q are thereby permitted to straddle the posts M and to engage with and be disengaged from said posts by simply loosening the binding-nuts by which the said plates and the said arms are clamped together and without the necessity of removing the nuts from the posts, the said perforations being countersunk to receive correspondingly-formed ends of the binding-nuts, and thus prevent disengagement of the arms until the nuts are unscrewed sufficient to allow the surface of the arms to clear the rounded ends thereof. The bolts H pass through the hollow bosses K, the threaded ends of said bolts passing through perforations R of the bridge-pieces, and the nuts I engaging the bolts on the under side thereof, thus preventing separation of the bolts and the bridge-pieces. The springs O are coiled around the bolts H and their ends bear against the inner ends of the hollow bosses and against the bridge-pieces, as shown, thus exerting a forward pressure on ring F, which also presses the glass against the flange C, thereby securing the latter in place against the said flange. To insert a glass, the nuts N are unscrewed, as hereinbefore explained, the arms J withdrawn from engagement with the plates L, the perforations R in the bridge-pieces G being of sufficient size to permit of same, and the ring F, with its attachments, removed from the extension. After placing the glass in position the holder is returned to its place and the binding-nuts screwed back to place tight against the plates, as before.

It will be observed from the foregoing description of my improved device that it will adjust itself to variations in thickness of glass, the bolts or rods H being of a length sufficient to allow for such variations, that the springs may be made of sufficient stiffness to hold the glass securely in place and yet yield readily to any expansion of same which would otherwise crack the glass and make replacement thereof necessary, and it is to be further observed that a rubber or other washer of soft material is not an element of the invention necessary to prevent breaking of glass, but that the same is employed as a means of filling up such open spaces as may be formed by irregularities in the annular flange of the extension and through which water, dust, &c., might otherwise enter and accumulate within the case. It will also be further observed that the structural details described herein may be modified without departing from the spirit of my invention.

Having thus fully described my invention, I claim as new and desire to secure by Letters Patent—

1. A resilient glass-holder consisting of a ring, a plurality of bolts or rods attached thereto, arms through which said bolts or rods operate, springs adapted to exert pressure against said ring and to force the same forward from said arms, in combination with means for securing said arms to suitable supports substantially as and for the purpose set forth.

2. A resilient glass-holder consisting of a ring, a plurality of bolts or rods attached thereto, plates adapted to be secured to a lamp-case, arms through which said bolts or rods operate, springs adapted to exert pressure against said ring and to force the same forward from said arms, in combination with means for securing said arms to said plates, substantially as described and for the purpose set forth.

3. In a locomotive or other headlight or lamp, the combination with the front wall of the case thereof, of an extension-rim attached thereto and having an annular flange at the outer end thereof, a glass disk contained within said extension-rim, a ring of metal or other suitable material around the edge of the said glass disk on the inside thereof, a plurality of bolts or rods connected with said ring and extending toward the rear of said extension-rim, arms through which said bolts or rods operate, plates secured to said case, means for securing said arms to said plates, and springs surrounding said bolts or rods, whereby pressure is exerted against said ring and thereby transmitted to said glass disk to press the same against said annular flange, substantially as described, and for the purpose set forth.

4. In a locomotive or other headlight or lamp, the combination with the front wall of the case thereof, of an extension-rim attached thereto and having an annular flange at the outer end thereof, a glass disk contained within said extension-rim and having a bearing against said annular flange, a ring of metal or other suitable material around the edge of said glass disk on the inside thereof, a plurality of bolts or rods loosely connected with said ring and extending toward the rear of said extension-rim, bifurcated arms through which said bolts or rods operate, plates secured to said case, means for securing said arms to said plates, and springs surrounding said bolts or rods, whereby pressure is exerted against said ring and thereby transmitted to said glass disk to press the same against said annular flange, substantially as described and for the purpose set forth.

5. In a locomotive or other headlight or lamp, the combination with the front wall of the case thereof, of an extension-rim attached thereto and having an annular flange at the outer end thereof, a glass disk contained within said extension-rim and having an elastic binding around the edge thereof, a follower-ring located behind the said glass disk, a plurality of bolts or rods connected with said ring and projecting toward the rear of said extension-rim, arms through which said bolts or rods operate, means for securing said arms in a detachable manner to said case, and springs surrounding said bolts or rods, whereby pressure is exerted against said ring and thereby transmitted to said glass disk to press the same against said annular flange, substantially as described and for the purpose set forth.

6. The combination with the case of a locomotive or other headlight or lamp, of the extension-rim B, having the annular flange C, glass disk D, ring F provided with the bridge-pieces G, bolts or rods H, nuts I, bifurcated arms J provided with perforations through which the said bolts or rods operate, plates L having posts M projecting therefrom, binding-nuts N, and springs O, all arranged to operate substantially as set forth.

7. The combination with the case of a locomotive or other headlight or lamp, of the extension-rim B having the annular flange C, glass disk D, the rubber or other elastic binding E, ring F provided with the bridge-pieces G, bolts or rods H, nuts I, bifurcated arms J provided with perforations through which said bolts or rods operate, plates L having posts M projecting therefrom, binding-nuts N, and springs O, all arranged to operate substantially as set forth.

In testimony whereof I hereunto subscribe my name this 4th day of December, 1897.

JOHN KIRBY, Jr.

In presence of—
  N. EMMONS, Jr.,
  ED. L. SPENCER.